United States Patent Office 3,454,512
Patented July 8, 1969

3,454,512
DYEABLE COMPOSITIONS COMPRISING POLYPROPYLENE, POLYAMIDE AND ETHYLENE COPOLYMER
Mukhtar Ahmed, Drummondville, Quebec, Canada, assignor to Chemcell (1963) Limited, Montreal, Quebec, Canada
No Drawing. Filed May 11, 1966, Ser. No. 549,147
Claims priority, application Canada, Dec. 22, 1965, 948,470
Int. Cl. C08f 29/02, 45/00; D06p 3/24
U.S. Cl. 260—23
10 Claims

ABSTRACT OF THE DISCLOSURE

Dyeable polypropylene compositions comprising a polyamide and an ethylene copolymer are disclosed. The polyamides are derived from polymeric fatty acids, and the copolymers are those of ethylene and an unsaturated ester. Hydrolysis products of said copolymers are also contemplated.

---

The present invention relates to the manufacture of polypropylene compositions and articles having improved dyeing properties.

In accordance with the invention, there are provided alloy compositions and shaped articles consisting essentially of a uniform admixture of stereoregular polypropylene and a linear low molecular weight thermoplastic unreactive polyamide and an addition polymer selected from the group consisting of copolymers of ethylene and an ethylenically unsaturated ester of a saturated fatty acid or partial or complete hydrolyzed products of such copolymers, which can be readily extruded to form fibers.

The amount of polyamide resin component may range from about 1% to 10%, preferably from about 2% to 8% of the total weight of the alloy. The amount of the copolymer component may range from about 1% to 15%, preferably from about 2% to 10% of the total weight of the alloy. The total weight of the additive system, i.e. the polyamide and the ethylene copolymer taken together, may range from about 5% to 20%, preferably from about 7% to 15%. Within this limit, the two additives can be mixed in any reasonable proportions preferably between about 1:2 to about 2:1 of one to the other.

The alloy composition of the invention may also include the usual amounts of stabilizers, antistatic agents, and other auxiliaries. The alloy may be formed into any desired shape, for example filaments, and dyed with direct, acid, premetallized, disperse, chrome, onium, condensations, vat, sulphur, vat esters or reactive dyestuffs. If minute quantities of some chelatable metal containing compound are also added in the composition, the shaped articles can also be dyed with a dyestuff capable of forming complexes with polyvalent metals of said chelatable metal compound.

Such materials can be dyed to a very deep shade of good colour fastness. This enhancement of colour depth is obtainable with any dyestuff, which will dye stereoregular polypropylene fibre and many other dyestuffs which do not stain unmodified polypropylene. This includes those dyestuffs soluble in water as well as those generally applied as dispersions or those formed in situ by the proper choice of dye-intermediates.

The alloys of this invention are readily prepared by mixing and blending. For example, stereoregular polypropylene flake or molding powder granules, and particles or granules of the ethylene-ester copolymer or hydrolyzed product thereof and particles or granules of the said polyamide resin may be preliminarily mixed together in a tumbling barrel or in a Conaform blender, or a Sweetie barrel, or in a ribbon mixer or the like, and the resulting mixture may then be intimately blended by malaxating on a hot two-roll mill, or in a Banbury mixer, or in the barrel of a heated extruding apparatus to prepare the desired alloy which may then be directly melt spun into filaments, or reduced to suitable granules by conventional comminuting methods for charging to a melt spinning apparatus, or by dissolving in a suitable solvent for solvent spinning. If the particle size of the components of the alloys of this invention is sufficiently small, the admixture can be directly fed to a proper melt spinning apparatus without intermediate melt mixing.

The additives, i.e., the polyamide and the copolymer or its hydrolysis product may be conveniently prepared as a composition of matter, itself constituting an article of commerce having unexpected properties. This composition can be packaged and sold as such so that the two key additives of the invention may be added together to the polypropylene at the time of blending.

The stereoregular homopolymer polypropylene employed is a standard article of commerce, often called isotactic polypropylene. The polymer can, and normally will, contain ingredients other than those necessary to mention in describing this invention. Such other ingredients may include, by way of example, antiacids, antioxidants, U.V. absorbers, and so on.

The polyamides are essentially amorphous linear thermoplastic resins, derived from the condensation of a dimeric fatty acid with various polyamines. The manufacture of these types of resins is taught for example in U.S. Patent 2,379,413 and commercially available, under the trade mark of "Versamid," for example, "Versamid 930," "Versamid 940," "Versamid 950," "Versamid 725" and, under the trademark of "Emerez," for example, "Emerez 1535," "Emerez 1532" and "Emerez 1540." The preferred polyamides employed in this invention have a softening point from about 100° C. to about 140° C., kinematic viscosity at 160° C. from about 3 to 4 to 30 to 40 poises, and an amine value of about 2 to about 10 (mg. KOH/gm.). These polyamides should preferably be of the non-reactive type, the use of reactive polyamide not being precluded.

The addition polymers, i.e. the copolymers, or the hydrolysis products thereof, of ethylene and ethylenically unsaturated esters of saturated fatty acids are essentially amorphous high molecular weight solid resins having a weight ratio of ester to ethylene between 15:85 and 60:40, a melt index of 2 to 200, but preferably in the range of the melt index of the polypropylene, and a softening point of about 100° C. to about 140° C. These copolymers can be prepared by copolymerizing a mixture of ethylene and ester using catalysts and conditions known to the art. Suitable methods are disclosed, for example, in U.S. Patents 2,200,429, 2,394,960, 2,395,381 and 2,703,794.

The ethylenically unsaturated esters of saturated fatty acids have the general formula RCOOR' in which R is selected from the group consisting of hydrogen and straight or branched chain alkyl radicals and R' is an alkenyl radical having a terminal

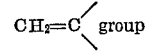

Vinyl formate, vinyl acetate, vinyl propionate, allyl acetate, allyl propionate, isopropenyl butrate, hexenyl acetate, and the like are typical. Copolymers of ethylene and vinyl acetate are preferred. The hydrolyzed products can be prepared, for instance, by dissolving the corresponding copolymer of ethylene and the ester in suitable solvent, adding 5% alcoholic KOH solution (5 mg./100 cc. of ethanol or methanol), refluxing for ½ to 2 hours, precipitating the reaction product with a mixture of water and methanol, washing and drying under vacuum. A product having any degree of hydrolysis up to 100% can be employed in the formation of the alloy. Hydrolyzed products are preferred to their corresponding copolymers since they give alloys of higher melting point. The use of the hydrolyzed products also results in somewhat improved affinity for certain dye classes.

The optional polyvalent metal compound can be any polyvalent compound that releases its metal atoms for chelation or formation of complexes with dye molecules which can form such complexes. It may be inorganic or organic in nature. Typical examples are compounds of zinc, cadmium, aluminum, tin, chromium, iron, cobalt and nickel. Compounds of copper are not suitable because they destroy the heat stability of the resin. Organic compounds are preferred as more compatible with the alloys of the invention and as releasing their metal atoms more readily for formation of complexes with dyestuffs capable of forming such complexes. The polyvalent metals in the form of a polyvalent metal compound uniformly distributed therein can range from 0.01% to 5% by total weight of the alloy. Polyvalent metal atoms such as nickel or chromium in organometallic compounds which are added to stereoregular polypropylene as stabilizers against the degrading effect of light and heat may also form insoluble stable complexes with dye molecules capable of forming such complexes. Then, sufficient polyvalent metal compound is used to provide for both stabilization of the alloy fibres and formation of insoluble stable complexes with the proper dye molecules. Mixtures of more than one of any of the component materials in the alloys may be employed, as for example, two or more polyamides or two or more copolymers or hydrolysis products thereof, or one or more of each of the latter.

The forming of the alloys into filamentary material may be done by any of the conventional spinning, knitting and weaving procedures with known lubricating, finishing, delustring, brightening, antistatic agents, and so on. The alloys are formed preferably initially into continuous filaments by melt spinning. Typical melt extrusion conditions for alloys of this invention are as follows:

| | |
|---|---|
| Extruder temperature | 250° C. |
| Spinneret | 50 hole/.008 inch diameter. |
| Extrusion speed (f./min.) | 115. |
| Stretch ratio | 4 ×. |
| Final denier | 180/50. |

The resulting fibres of these alloys have mechanical properties close to those of conventional polypropylene. The following shows some of the mechanical properties of a typical fibre, melt spun under the above conditions from an alloy of the following composition:

| | |
|---|---|
| Polypropylene | (Profax 6301)=90%. |
| Polyamide | (Versamid 940)=5%. |
| Copolymer | (Hydrolyzed product of vinylacetate/ethylene ratio of 40:60)=5%. |
| Tensile (g.) | 635. |
| Elongation (percent) | 37.7. |
| Tenacity (g./d.) | 3.6. |
| Toughness (g. cm./d. cm.) | 1.2. |

The fibres can be dyed in the form of continuous filaments, staple fibre, or yarns, threads or cords, etc., produced from such filaments or staple fibre, as well as fabric knitted or woven therefrom. Prior to dyeing, the filamentary material should be given a conventional scouring treatment in an aqueous detergent or soap bath to remove residual spinning and weaving lubricants and sizing agents.

There may be used direct, acid, premetallized, disperse, vat, vat ester, sulphur, azoic, metal chelating, onium, condensation, and reactive dyes at 60 to 95° C. on winches and jigs or at higher temperatures in steam oven or pressure dyeing apparatus. The products made therefrom can also be readily printed by conventional methods using a number of dyestuff classes mentioned above. In most of the cases, the colour fastness of the dyed fibre is good or can be satisfactorily improved by after-treatments known to the art.

Artificial fibres prepared from alloys of this invention can be dyed with many different classes of dyestuffs. In general, these useful dyes fall into the following main classes or types: direct dyes, disperse dyes, acid dyes, chrome dyes, premetallized dyes, vat and sulphur dyes, vat esters, azoic intermediates, onium or ingrain dyes, condensation dyes, and metallizable disperse dyes. These are well known dye types, and a substantial listing of individual dyes of each type appears in the Technical Manual of the American Association of Textile Chemists and Colorists (AATCC). The Color Index is also a useful source of information.

The dyeing of fibres, produced from the alloys of this invention, with direct, disperse, acid, chrome, premetallized, vat esters, and condensation dyes can be performed by a method similar to that applied in the dyeing of polyamides. Vat dyes can be applied advantageously in the form of their free leuco acids at a pH of 5–6 and at a temperature of 80° C. or higher. Azoic intermediates are applied by first absorbing the coupling component at a pH of 5–6 and then developing the colour on fabricated material in a bath of diazotized amine at a pH of 6–7 and at temperature of 80 to 95° C. Onium or ingrain dyes can be applied to any depth of shade from a bath of pH 3–4 and containing working amounts of a carrier and a small amount of sodium chloride.

The particular dyeing procedure employed depends upon the type of dye selected. Methods for dyeing hydrophobic fibres are well known in the art and are readily adapted for dyeing the alloy fibres of this invention, in the light of the discussion of these dye classes in relation to the invention. Following the dyeing, the dyed fibres are given a conventional hot soaping and are thoroughly rinsed and dried. For further improving the wet fastness of acid and premetallized dyestuffs, an after-treatment with a cation active agent or tarter emetic/tannin can be used to advantage.

The description herein, with particular reference to immersion dyeing of the alloy fibres of this invention, is readily adaptable to commercial machinery and techniques for kier, package and rope dyeing, jig and winch dyeing of piece goods and to continuous dyeing by pad-steam methods. Moreover, the woven, knitted and tufted goods made from the fibres of these alloys can be readily printed by employing the techniques known to the art. Practice of this invention contemplates the use in any of the dye baths or printing pastes of various conventional dyebath assistants and auxiliaries, such as emulsifying agents, wetting agents, carriers, sequestrants, swelling agents, developers, protective colloids, stabilizers, and the like, in amounts commonly employed in the art of dyeing hydrophobic fibres.

The invention also contemplates the compositions of the invention and their dyeing in other forms than filaments, for example, films, foils, expanded foams, and the like.

EXAMPLES

The nature of the invention having been set forth, the following examples are supplied for illustrative purposes.

EXAMPLE A

For the sake of comparison, two alloys of the following compositions were prepared, extruded and the dyeing properties of the resulting fibres assessed:

| | Percent |
|---|---|
| (1) Polypropylene ("Profax 6301") | 95 |
| Polyamide ("Versamid 940") | 5 |
| (2) Polypropylene ("Profax 6301") | 90 |
| Polyamide ("Versamid 940") | 10 |

Alloy No. 1. above gave a yarn of very poor mechanical properties and was dyeable only to pastel shades with conventional dyes. Alloy No. 2. was very difficult to extrude under any extruding conditions and gave a very coarse yarn which could not be stretched. The dyeing properties were equally poor. For the sake of still further comparison, two alloys of the following compositions were prepared, extruded and the dyeing properties of the resulting fibres assessed:

|  | Percent |
|---|---|
| (3) Polypropylene ("Profax 6301") | 95 |
| Polyethylene vinylacetate | 5 |
| (Vinylacetate/ethylene ratio=40:60) |  |
| (4) Polypropylene ("Profax 6301") | 90 |
| Polyethylene vinylacetate | 10 |
| (Vinylacetate/ethylene ratio=40:60) |  |

Both alloys 3 and 4 extruded well but had poor dyeing properties. The fibres could be coloured to only pastel and medium depth of shade and the colour fastness of the anionic dyes was only marginal.

In contrast the use of the polyamide and the ethylene copolymer in the same total concentration in the alloy resulted in smooth extrusion, a fibre of good physical properties and a remarkable affinity for a number of classes of dyestuffs. A kind of synergism seems to exist when the polyamide and the ethylene copolymer are present together in alloys of the invention. This synergism in extrusion behavior, physical properties of the fibre and the dyeability with different dyestuffs is still more evident from the following example (Table 1).

For dyeing, each fabric specimen was scoured at a 40 to 1 liquor to fabric ratio by weight in an aqueous bath containing 1% by weight of a non-ionic alkylphenoxy-poly (ethyleneoxy) ethanol detergent (marketed under "Igepal CO-630," the trademark of General Aniline and Film Corp.). The scoured fabric specimens were then well rinsed and kept damp for dyeing.

The rinsed, damp fabric for each example was dyed in a bath at a 40.1 dye liquor to fabric ratio by weight at 85 to 90° C. for about 2 hours. The fabric was then rinsed with warm water and soaped at 40° C. with a 1% solution of Igepal CO-630 for about 30 minutes, rinsed with water and dried.

The dyed fabric specimens were compared visually for depth of shade and were then subjected to AATCC Laundering Test No. II; AATCC Dry Cleaning Test and to Fadeometer exposure for 5, 10, 20, 40, 80, 160 and 320 standard hours.

For depth of shade the following rating scale was employed:

1=depth of shade on unalloyed stereoregular polypropylene fabric.
2=approximately twice the depth of shade of 1.
3=approximately 3 times depth of shade of 1.
4=approximately four times depth of shade of 1.
5=approximately five times depth of shade of 1.

For wash resistance and dry cleaning resistance tests,

TABLE 1

| Composition of the alloy: |  |  |  |
|---|---|---|---|
| Polypropylene ("Profax 6301") | 90% | 90% | 90%. |
| Polyamide ("Versamid 940") | 10% |  | 5%. |
| Ethylene-vinyl acetate copolymer (vinyl-acetate/ethylene ratio 40:60). |  | 10% | 5%. |
| Extrusion conditions: |  |  |  |
| Temperature | 265° C | 250° C | 248° C. |
| Spinneret | 75/.012 | 50/0.135 | 50/0.135. |
| Draw ratio | Not drawable | 4.2 | X4.5. |
| Denier (final) | 3,700 | 190/50 | 180/50. |
| Physical properties of the fibres: |  |  |  |
| Tensile (g.) | Breaks | 950 | 635. |
| Elongation (percent) | 50 | 40.8 | 37.7. |
| Tenacity (g./d.) | Brittle | 4.1 | 3.6. |
| Toughness (g. cm./d. cm.) | do | 1.1 | 1.2. |
| Dye affinity (depth of shade obtained from a 2% (OWF) dye solution under identical dyeing conditions): |  |  |  |
| Direct dyes | None | Practically none | Very good. |
| Disperse dyes | Fair | Excellent | Excellent. |
| Acidic dyes | do | Good | Very good. |
| 1:1 premetallized dyes | None | None | Good. |
| 1:2 premetallized dyes | Fair | Good | Very good. |
| Vat and sulphur | do | do | Do. |
| Chrome dyes | None | Fair | Do. |
| Onium dyes | do | Good | Do. |
| Azoic dyes | do | do | Do. |
| Reactive | do | None | Good. |

Examples 1 to 8

These examples compare dyeings made with representative dyes of various classes on fabrics knitted from 320/50 continuous filament yarns of stereoregular polypropylene, and from similar continuous filament yarns of alloys made from the same stereoregular polypropylene with different compositions within the scope of this invention. The composition of each yarn follows:

| Ingredients | Example Designation and Composition (parts by weight) | | | | | | | |
|---|---|---|---|---|---|---|---|---|
|  | (1) | (2) | (3) | (4) | (5) | (6) | (7) | (8) |
| Stereoregular Polypropylene | 100 | 90 | 90 | 90 | 90 | 90 | 90 | 87 |
| 40 Vinylacetate:60 Ethylene Copolymer |  | 5 | 7 | 4 |  |  |  |  |
| 70% Hydrolyzed product of 40 Vinylacetate:60 Ethylene Copolymer |  |  |  |  | 5 | 7 | 4 | 5 |
| "Versamid 940" (Polyamide) |  | 5 | 3 | 6 | 5 | 3 | 6 | 8 |
| 20 Vinylacetate:80 Ethylene Copolymer |  |  |  |  |  |  |  |  |

In addition to the above ingredients, each alloy contained stabilizing quantities of a commercial stabilizer. The ingredients, all in powder form, were mixed in a conaform blender for ½ hour and then melt spun and stretched according to the common practice of the art to 320/50 continuous filament yarns which were then knitted on a double knitting machine into fabric specimens.

a scale of 1 to 5 was employed having the following significance:

5=no visible fading or loss of colour.
4=very slight fading or loss of colour.
3=appreciable fading or loss of colour.
2=marked fading or loss of colour.
1=complete loss of colour.

The above scale of colour fastness ratings is interpreted in terms of International Gray Scale as described in the Technical Manual of the AATCC.

For light resistance a scale of 1 to 8 was employed, having the following significance:

8=no visible fading after 320 standard Fadeometer hours.
7=just appreciable fading after 160 hours.

6=just appreciable fading after 80 hours.
5=just appreciable fading after 40 hours.
4=just appreciable fading after 20 hours.
3=just appreciable fading after 10 hours.
2=just appreciable fading after 5 hours.
1=complete loss of colour on exposure to light.

Comparative data obtained for Examples 1 to 8 follows in Tables 2 and 3.

the range from about 2% to about 8% by weight and the addition polymer is present in an amount within the range from about 2% to about 10%.

5. Shaped material made from a composition of matter as defined in claim 1.

6. A fiber extruded from a composition as defined in claim 1.

7. The dyed composition of matter of claim 1.

TABLE 2

| Commercial Designation of the Type | Dye Class | Dye Test Ratings for Respective Examples | | | | | | | |
|---|---|---|---|---|---|---|---|---|---|
| | | (1) | (2) | (3) | (4) | (5) | (6) | (7) | (8) |
| Latyl Cerise N | Disperse | 1 | 4 | 4 | 3 | 5 | 5 | 5 | 3 |
| Supernylite Yellow G | Acid | 1 | 3 | 3 | 4 | 4 | 3 | 4 | 2 |
| Neonyl Orange SLF | Metallized 1:1 | 1 | 5 | 4 | 5 | 5 | 4 | 5 | 4 |
| Irgalan Brown GRL | Metallized 1:2 | 1 | 5 | 5 | 5 | 5 | 5 | 5 | 4 |
| Solophenyl Turquoise GL | Direct | 1 | 4 | 3 | 4 | 5 | 4 | 5 | 4 |
| Indanthrene Green FFB | Vat | 1 | 4 | 4 | 4 | 4 | 4 | 4 | 4 |
| Algosol Brilliant Violet 14R-CF | Vat Ester | 1 | 2 | 2 | 2 | 3 | 2 | 3 | 2 |
| Thionol Green BF | Sulphur | 1 | 2 | 2 | 2 | 3 | 2 | 3 | 3 |
| Chrome Brown 2R | Chrome | 1 | 3 | 3 | 3 | 4 | 4 | 3 | 3 |
| Pthalogen Blue 1F3GM | Ingrain | 1 | 5 | 5 | 5 | 5 | 5 | 5 | 5 |
| Inthion Green 1B | Condensation | 1 | 2 | 2 | 2 | 2 | 2 | 2 | 2 |
| Naphtol AS-STR/Red STR Salt | Azoic | 1 | 4 | 4 | 4 | 5 | 4 | 4 | 3 |
| Diapolan Blue BL | Metallizable | 1 | 2 | 2 | 2 | 2 | 2 | 2 | 2 |
| Ramazol Red 3B | Reactive | 1 | 3 | 3 | 3 | 4 | 3 | 3 | 2 |

TABLE 3

| Commercial Designation of the Dye | Dye Class | Fastness Ratings for Respective Samples* | | | | | | | |
|---|---|---|---|---|---|---|---|---|---|
| | | (1) | (2) | (3) | (4) | (5) | (6) | (7) | (8) |
| Latyl Cerise N | Disperse | W1D1L4 | W3D1L6 | W3D1L6 | W3D1L6 | W3D1L6 | W3D1L6 | W3D1L6 | W3D1L6 |
| Supernylite Yellow G | Acid | | W3D5L5 | W3D5L5 | W4D5L5 | W4D5L5 | W3D5L5 | W4D5L5 | W3D5L5 |
| Neonyl Orange SLF | 1:1 Metallized | | W3D5L6 | W3D5L6 | W4D5L6 | W3D5L6 | W3D5L6 | W4D5L6 | W3D5L5 |
| Irgalan Brown GRL | 1:2 Metallized | W1D1L2 | W2D4L7 | W2D4L7 | W2E4L7 | W2D4L7 | W2D4L7 | W3D4L7 | W2D4L6 |
| Solophenyl Turquoise GL | Direct | | W4D5L6 | W4D5L6 | W4D5L6 | W4D5L6 | W4D5L6 | W4D5L6 | W3D5L6 |
| Indanthrene Green FFB | Vat | W5D5L5 | W5D5L7 | W5D5L7 | W5D5L7 | W5D5L7 | W5D5L7 | W5D5L7 | W5D5L5 |
| Algosol Brilliant Violet 14R-CF | Vat Ester | W5D5L5 | W5D5L6 | W5D5L6 | W5D5L6 | W5D5L6 | W5D5L6 | W5D5L6 | W5D5L6 |
| Thionol Green BF | Sulphur | W1D1L1 | W5D5L5 | W5D5L5 | W5D5L5 | W5D5L5 | W5D5L5 | W5D5L5 | W5D5L5 |
| Chrome Brown 2R | Chrome | | W5D5L5 | W5D5L5 | W5D5L5 | W5D5L5 | W5D5L5 | W5D5L5 | W5D5L4 |
| Pthalogen Blue 1F3GM | Ingrain | | W5D5L7 | W5D5L7 | W5D5L7 | W5D5L7 | W5D5L7 | W5D5L7 | W5D5L7 |
| Inthion Green 1B | Condensation | W5D4L5 | W4D4L5 | W4D4L5 | W3D4L5 | W4D4L5 | W5D4L5 | W3D4L5 | W4D4L5 |
| Naphtol AS-STR/Red STR Salt | Azoic | W4D4L1 | W5D5L5 | W5D5L6 | W5D5L6 | W5D5L6 | W5D5L6 | W5D5L6 | W5D5L6 |
| Diapolon Blue BL | Metallizable | W5D5L6 | W5D5L6 | W5D5L6 | W5D5L6 | W5D5L6 | W5D5L6 | W5D5L6 | W5D5L6 |
| Ramazol Red 3B | Reactive | | W3D5L4 | W3D5L4 | W4D5L4 | W3D5L4 | W3D5L4 | W4D5L4 | W3D5L4 |

*W=Fastness to washing; D=Fastness to dry cleaning; L=Fastness to light.

I claim:

1. A composition of matter consisting essentially of a uniform admixture of polypropylene, from about 1% to about 10% by weight of a linear thermoplastic polyamide, wherein the amide groups of said polyamide are an integral part of the polymer chain resulting from the condensation of polymeric fatty acids and polyamines, and from about 1% to about 15% by weight of an addition polymer selected from the group consisting of copolymers of ethylene and ethylenically unsaturated esters of saturated fatty acids wherein the ratio of the ester to the ethylene component is within the range from about 20:80 to about 60:40, and partial or complete hydrolysis products of such copolymers, the total concentration of the polyamide and addition polymer being within the range from about 5% to about 25% of the total weight of the composition.

2. A composition of matter, as defined in claim 1, in which the polyamide is present in an amount within the range from about 2% to about 8% by weight.

3. A composition of matter, as defined in claim 1, in which the addition polymer is present in an amount within the range from about 2% to about 10%.

4. A composition of matter, as defined in claim 1, in which the polyamide is present in an amount within 8. A fiber extruded from the composition of claim 1 and dyed.

9. A composition of matter, as defined in claim 1, which contains a polyvalent metal compound as a chelating agent in an amount from about 0.01% to about 5% by weight of the total composition.

10. A method of dyeing polypropylene, comprising, providing a composition as defined in claim 1, shaping the composition to form a shaped material, and dyeing said shaped material.

References Cited

UNITED STATES PATENTS

| 3,199,940 | 8/1965 | Toureille | 8—21 |
| 3,226,455 | 12/1965 | Matsubayashi et al. | 260—897 |
| 3,240,552 | 3/1966 | Joyner et al. | 8—39 |
| 3,300,548 | 1/1967 | Baum et al. | 260—897 |
| 3,326,826 | 6/1967 | Cohen | 260—23 |
| 3,361,843 | 1/1968 | Miller et al. | 260—857 |

DONALD E. CZAJA, Primary Examiner.

R. A. WHITE, Assistant Examiner.

U.S. Cl. X.R.

8—42, 55; 260—94.9, 857, 897